(12) United States Patent
Ohmura

(10) Patent No.: US 7,321,955 B2
(45) Date of Patent: Jan. 22, 2008

(54) CONTROL DEVICE, CONTROL METHOD AND STORAGE MEDIUM RECORDING A CONTROL PROGRAM FOR CONTROLLING WRITE-BACK SCHEDULE OF DATA FROM CACHE MEMORY TO A PLURALITY OF STORAGE DEVICES

(75) Inventor: Hideaki Ohmura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 10/935,080

(22) Filed: Sep. 8, 2004

(65) Prior Publication Data

US 2005/0223168 A1 Oct. 6, 2005

(30) Foreign Application Priority Data

Mar. 31, 2004 (JP) ............................. 2004-107030

(51) Int. Cl.
*G06F 12/12* (2006.01)
(52) U.S. Cl. ................. 711/136; 711/113; 711/114; 711/133; 711/134; 711/135; 711/143
(58) Field of Classification Search ................ 711/113, 711/114, 133, 134, 135, 136, 143
See application file for complete search history.

(56) References Cited

U.S. PATENT DOCUMENTS

| 5,734,859 | A  | * | 3/1998 | Yorimitsu et al. ......... 711/112 |
| 5,787,473 | A  | * | 7/1998 | Vishlitzky et al. ........ 711/134 |
| 6,304,946 | B1 | * | 10/2001 | Mason, Jr. ................. 711/143 |
| 6,665,740 | B1 | * | 12/2003 | Mason et al. ................. 710/6 |
| 6,785,771 | B2 | * | 8/2004 | Ash et al. .................... 711/136 |
| 7,039,785 | B2 | * | 5/2006 | Fujibayashi ................. 711/170 |
| 2004/0030848 | A1 | * | 2/2004 | Walton et al. .............. 711/155 |
| 2004/0230742 | A1 | * | 11/2004 | Ikeuchi et al. ............. 711/112 |

FOREIGN PATENT DOCUMENTS

| JP | 11-288387 | 10/1999 |
| JP | 2003-196032 | 7/2003 |

* cited by examiner

*Primary Examiner*—Sanjiv Shah
*Assistant Examiner*—Daniel Tsui
(74) *Attorney, Agent, or Firm*—Staas & Halsey LLP

(57) ABSTRACT

The storage control device of the present invention controls a plurality of storage devices. The storage control device comprises an LRU write-back unit writing back data stored in the cache memory of the storage control device into the plurality of storage devices by the LRU method, and a write-back schedule processing unit selecting a storage device with a small number of write-backs executed by the LRU write-back unit and writing back data into the selected storage device.

17 Claims, 14 Drawing Sheets

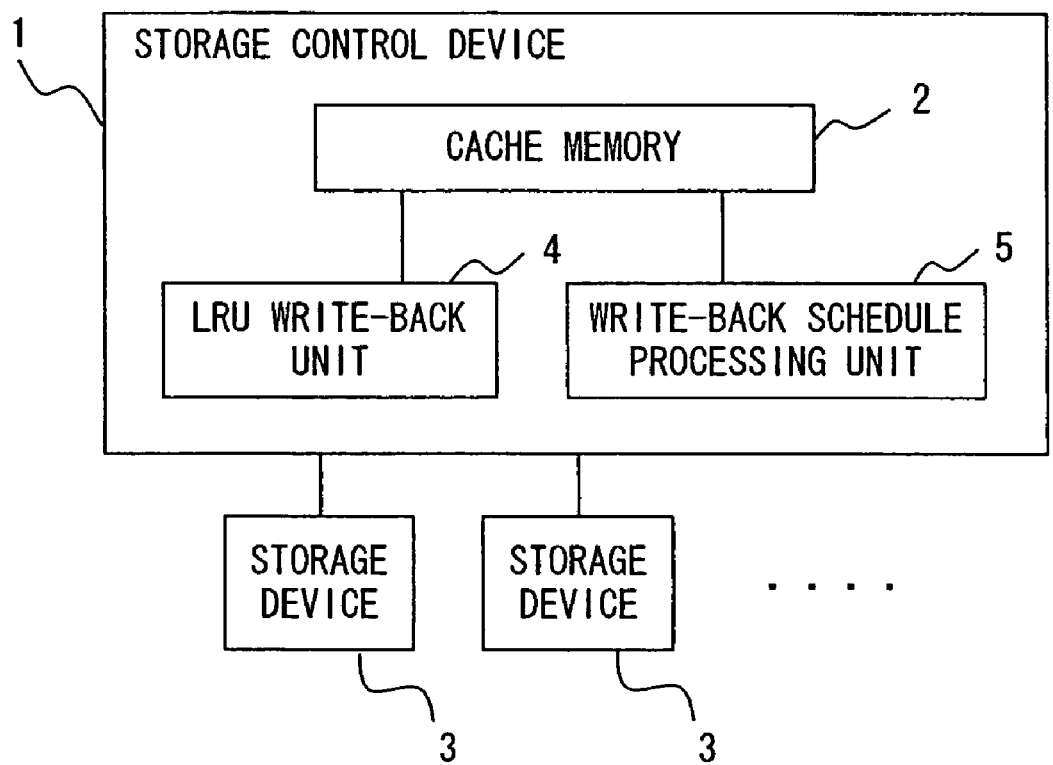
F I G. 2

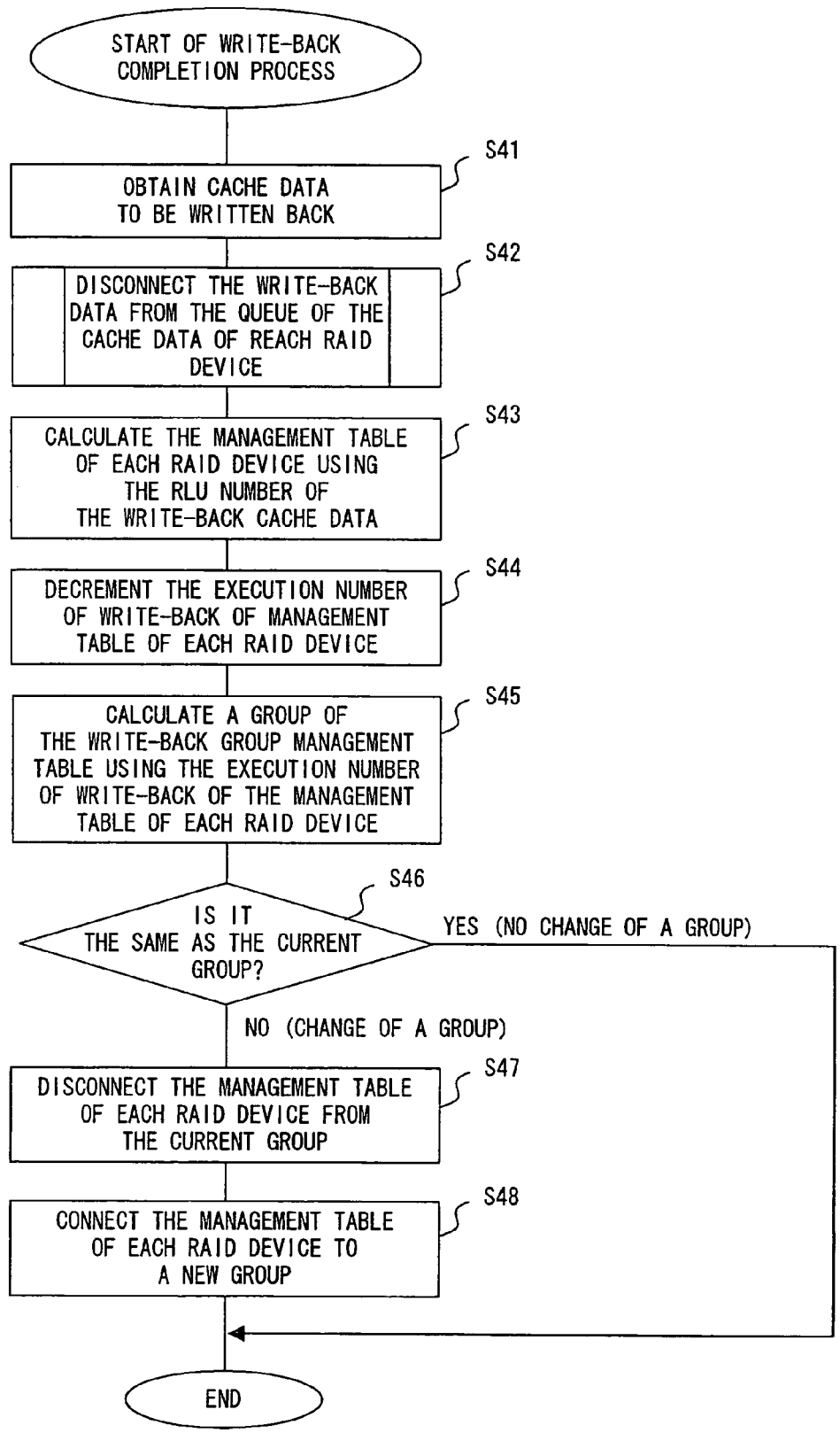
F I G. 9

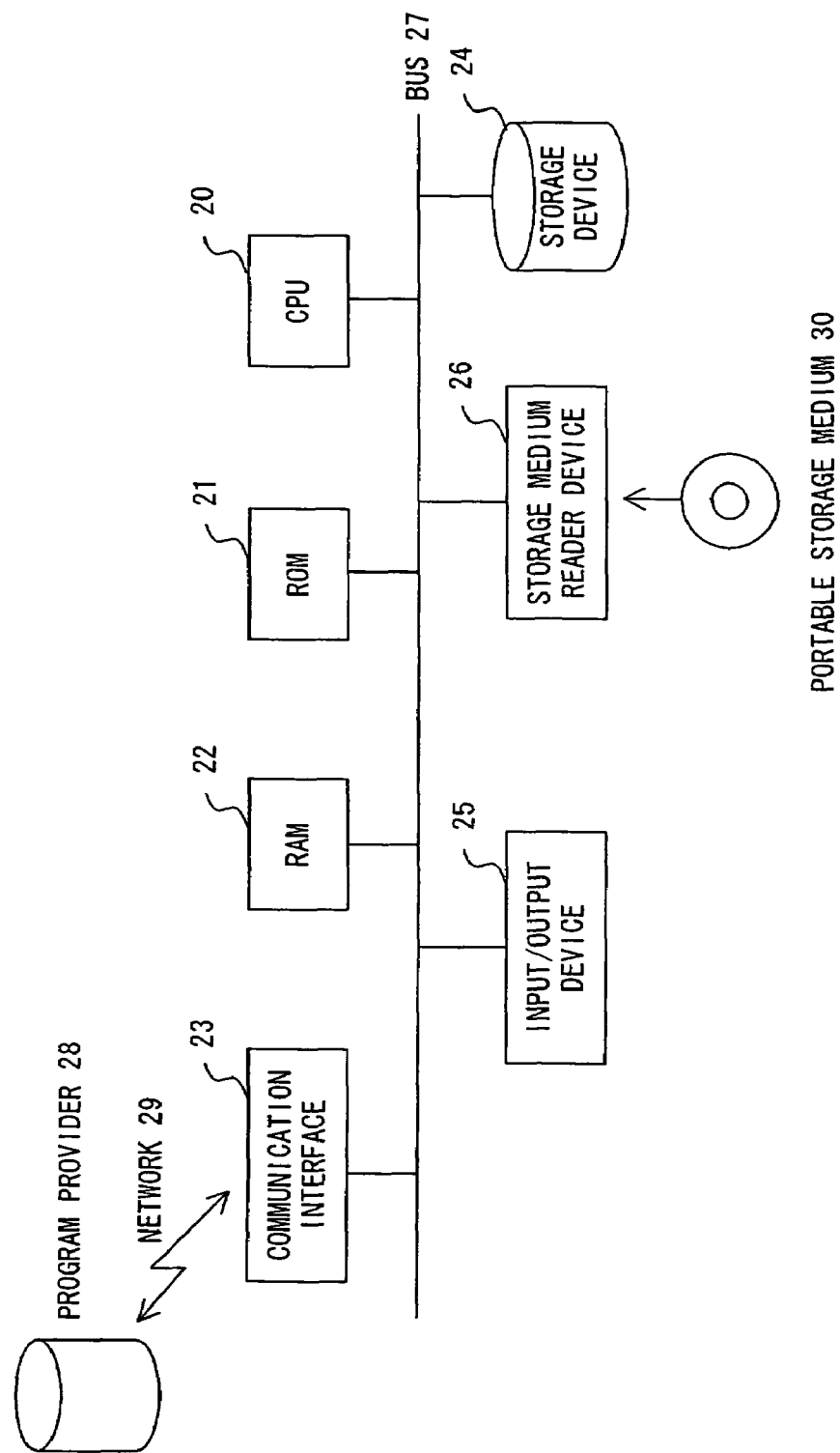
F I G. 14

CONTROL DEVICE, CONTROL METHOD AND STORAGE MEDIUM RECORDING A CONTROL PROGRAM FOR CONTROLLING WRITE-BACK SCHEDULE OF DATA FROM CACHE MEMORY TO A PLURALITY OF STORAGE DEVICES

BACKGROUND OF THE INVENTION

1. Field of the Invention

The present invention relates to a data storage method, and more particularly relates to a magnetic disk control device provided with cache memory in which data is read/written according to instructions from a host computer in association with a magnetic disk system using a disk array.

2. Description of the Related Art

Lately disk devices, such as magnetic disk devices, optical disk devices and the like, that are characterized by the non-volatility and large capacity of stored data have been widely used as the external storage devices of a computer. As a disk device which duplicates the contents of data and stores data adding redundant information, such as parity data and the like, a redundant array of inexpensive disk (RAID) device is used.

In both such a RAID device and a RAID control device controlling the transfer of data, for example, between the RAID device and a host computer, data transfer performance is improved by mounting a large capacity of cache memory and temporarily storing data in the cache memory. As the amount of data to be handled increases, a huge number of various RAID devices, specifically, in the range of level from RAID 0 through RAID 5 are connected and used under the control of such a control device.

FIG. 1 explains a conventional example of a cache data management method in such a RAID control device. In FIG. 1, data located in an MRU position that is most frequently used by a host computer up to data a LRU position that is least frequently used are arrayed in the cache memory of the RAID control device, using a link or the like. If there is an access from the host computer, it is regarded that there is a cache hit, and the computer is connected to the MRU position as the most frequently used data.

In FIG. 1, write-back, that is, asynchronous writing into a disk device is applied to data written from the host computer into the cache memory. This write-back into the RAID device (disk) is applied from the least frequently accessed data, that is, data located in the LRU position by an LRU method, taking into consideration holistic performance as a data storage system.

However, write performance from the cache memory into the RAID device (disk) varies depending on a RAID type (level). Specifically, at RAID 0+1 and RAID 5 at which data is distributed to and written into a plurality of disk devices, since the plurality of disks operates in parallel, throughput performance is high. Conversely, at RAID 1 in which data with the same contents is written in two disk devices, since its performance cannot exceed the performance of a disk, its throughput performance is low.

If data to be written in a plurality of RAID devices each with different write-back performance is managed by data transfer through one segment of cache memory, write data into a device with a low write-back performance of RAID 1 is easily left in the cache memory. After the cache memory is filled with such left data, access performance to RAID 0+1 and RAID 5 also is affected by write-back performance into the disk device with RAID 1 and degrades, which is a problem.

As the prior art of such a RAID data storage system, there are the following references.
<Japanese Patent Laid-open Application No. 11-288387 "Disk Cache Device">
<<Japanese Patent Laid-open Application No. 2003-196032 "Write Cache Control Method of Storage Device and Storage Device">>

<Japanese Patent Laid-open Application No. 11-288387 "Disk Cache Device"> discloses a disk cache device in which valid data is prepared on a cache block so that RAID 3 access in which parity can be calculated, for example, in RAID 5 operation, without a disk lead, is possible in order to optimize a disk cache function.

<<Japanese Patent Laid-open Application No. 2003-196032 "Write Cache Control Method of Storage Device and Storage Device">> discloses a technology for improving throughput using a write cache controlling method capable of executing sequential data write without fail even when the addresses to be written designated by a host device are not consecutive in a write-back cache type storage device.

However, in such prior arts, if devices with a variety of levels are mixed as RAID devices, holistic performance as a data storage system is affected by a RAID device with low write-back performance and degrades.

SUMMARY OF THE PRESENT INVENTION

It is an object of the present invention to improve the overall performance of the data storage system by enabling the scheduling of the write-back to as many as possible RAID devices even when there is a plurality of RAID devices each with a different level under the control of a RAID control device, in order to solve the above-mentioned problems.

The storage control device of the present invention controls a plurality of storage devices. The storage control device comprises an LRU write-back unit writes back data stored in the cache memory of the storage control device into the plurality of storage devices by an LRU method and a write-back schedule processing unit selecting a storage device, the number of write-back executed by the LRU write-back unit of which is small and writing back the data into the selected storage device.

BRIEF DESCRIPTION OF THE DRAWINGS

FIG. 2 is a block diagram showing the basic configuration of the storage control device of the present invention;

FIG. 9 is a flowchart showing a write-back completion process;

FIG. 14 explains the loading onto a computer of a program for realizing the present invention.

DESCRIPTION OF THE PREFERRED EMBODIMENTS

Figure 1:
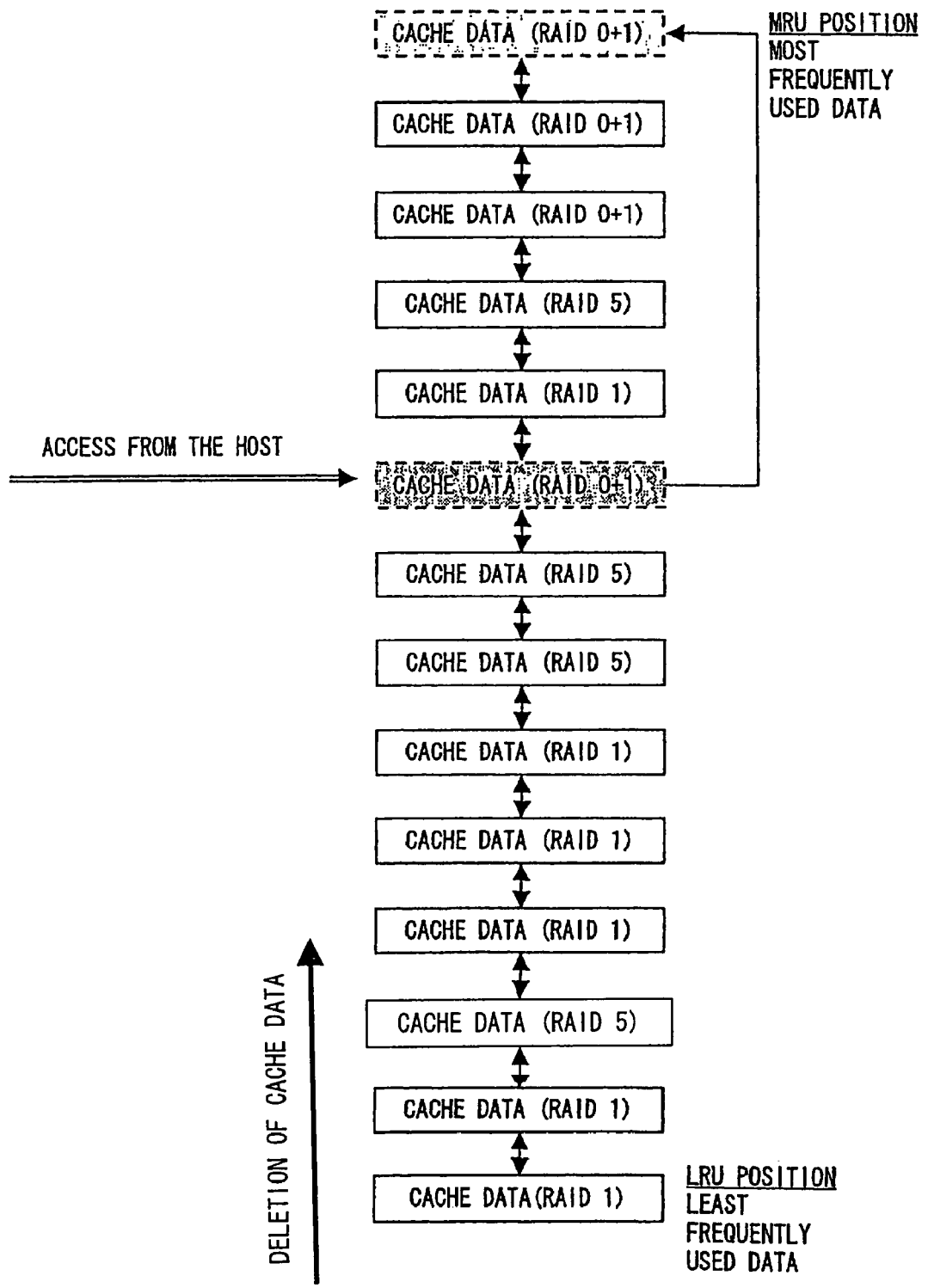
FIG. 1 explains a conventional example of cache data management by an LRU method.

FIG. 2 is a block diagram showing the basic configuration of the storage control device of the present invention, such as a RAID control device. In FIG. 2, the storage control device 1 comprises as basic components at least cache memory 2 controlling a plurality of storage devices 3, such as RAID devices, an LRU write-back unit 4 and a write-back schedule processing unit 5.

The LRU write-back unit 4 writes back data stored in the cache memory 2 of the storage control device 1 into a plurality of storage devices 3 by an LRU method (algorithm). The write-back schedule processing unit 5 selects a storage device 3, the number of write-backs executed by the LRU write-back unit 4 and writes back the data stored in the selected storage device 3.

In another preferred embodiment of the present invention, the storage control device 1 further comprises a write-back group management unit, such as a write-back group management table, storing the result of dividing the plurality of storage devices 3 into a plurality of groups according to the number of write-backs executed by the storage device 3. In this case, the write-back schedule processing unit 5 can select a storage device 3 belonging to a group in which the number of the write-backs executed by each storage device is small, according to the stored contents of the write-back group management unit 5.

In another preferred embodiment, the storage control device 1 further comprises a storage device management unit, such as a management table for each RAID device, storing the number of write-backs executed for each of a plurality of storage devices 3. In this case, the write-back schedule processing unit 5 can select a storage device 3 with a small number of executed write-backs, according to the stored contents of the write-back group management unit 5.

In another preferred embodiment, the storage control device 1 further comprises a cache memory allocation unit dividing the capacity of the cache memory of the storage control device 1 and allocating each divided capacity to the plurality of storage devices 3, and a storage management unit, such as a management table for each RAID device, storing the capacity of an unused area in which data is not stored in the cache memory, within the allocated capacity for each storage device. In this case, the write-back schedule processing unit 5 can select a storage device 3 with a small unused area according to the stored contents of the storage device management unit.

In this case, the storage control device 1 further comprises a cache memory management unit, such as a cache memory management table, managing the queue of data stored in the capacity of cache memory allocated to each storage device 3 for each storage device 3. In this case, the write-back schedule processing unit 5 can write back data located in the LRU position of a queue corresponding to the selected storage device 3.

In another preferred embodiment of the present invention, the above-mentioned storage device 3 can also be a RAID device provided with a plurality of disks, and the storage control device 1 can also be a RAID control device controlling a plurality of RAID devices.

Next, the data storage system of the present invention is composed of a storage control device comprising an LRU write-back unit writing back data stored in the cache memory of the device into a plurality of storage devices by an LRU method and a write-back schedule processing unit selecting a storage device with a small number of write-backs executed by the LRU write-back unit and writing back the data into the selected storage device, and a plurality of storage devices controlled by the storage control devices.

In the storage control method of the present invention, data stored in the cache memory of the storage control device is written back into a plurality of storage devices by an LRU method, a storage device with a small number of write-backs executed by the LRU method and the data into the selected storage device is written back.

A program for enabling a computer to execute this method and a computer-readable portable storage medium storing the program are used.

As described above, according to the present invention, firstly, cache memory can be prevented from being filled with data to be discharged into a storage device with low throughput performance by dividing the cache memory of the storage control device, such as a RAID control device by the number of a plurality of storage devices, such as RAID devices, and allocating each divided capacity to the plurality of storage devices.

The vacant capacity of the cache memory can be secured by managing the unused memory capacity of the cache memory capacity allocated to each RAID device and writing back the data of a RAID device with a small unused area.

Furthermore, by managing the execution number of write-backs for each RAID device and grouping RAID devices according to the number of write-backs, a RAID device with a small execution number of write-backs can be easily retrieved, and the write-back of a lot of RAID devices can be scheduled.

According to the present invention, even when there are a plurality of RAID devices each with a different RAID type (level) under the control of the RAID control device, performance degradation due to a RAID device with low write-back performance can be prevented and overall performance of the data storage system can be improved, which significantly contributes to improved performance of the RAID storage device system.

Figure 3:
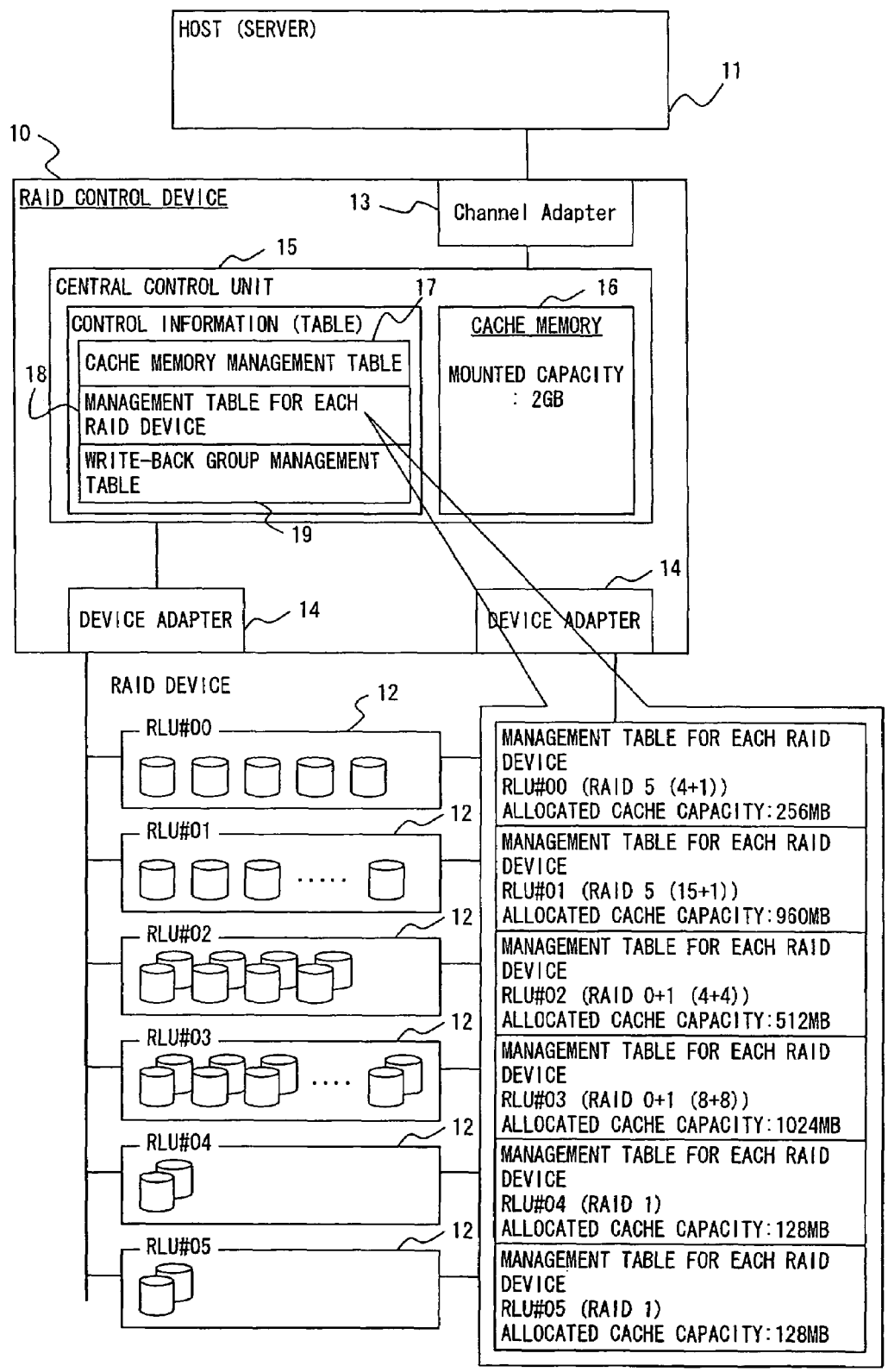
FIG. 3 is a block diagram showing the entire configuration of the RAID data storage system in the preferred embodiment.

FIG. 3 is a block diagram showing the entire configuration of the data storage system using a RAID control device of the present invention. In FIG. 3, the system is composed of the RAID control device 10, a host computer (server) 11 and a plurality of RAID devices 12.

The RAID control device 10 comprises a channel adapter 13 controlling data transfer with the host computer 11, a device adapter 14 controlling data transfer with the RAID device 12 and a central control unit 15 controlling the entire RAID control device 10.

The central control unit 15 comprises cache memory 16 temporarily storing data to be transferred between the host computer 11 and the RAID device 12, a cache memory management table 17 as a table storing a variety of control information, a management table 18 of each RAID device and a write-back group management table 19. In this case, the cache memory 16 has, for example, mounting capacity of 2 GB.

In FIG. 3, the RAID device 12 includes six RAID logical units (RLU), RLU#00 through RLU#05. The level each of RLU#04 and RLU#05 of them is RAID1 and the level of each of RLU#00 and RLU#01 is RAID5. RLU#00 comprises four data storage disks and one parity storage disk, and RLU#01 comprises 15 data storage disks and one parity storage disk. The level of each of RLU#02 and RLU#03 is RAID0+1. RLU#02 comprises four data storage disks and four mirror disks, and RLU#03 comprises eight data storage disks and eight mirror disks.

Figure 4:
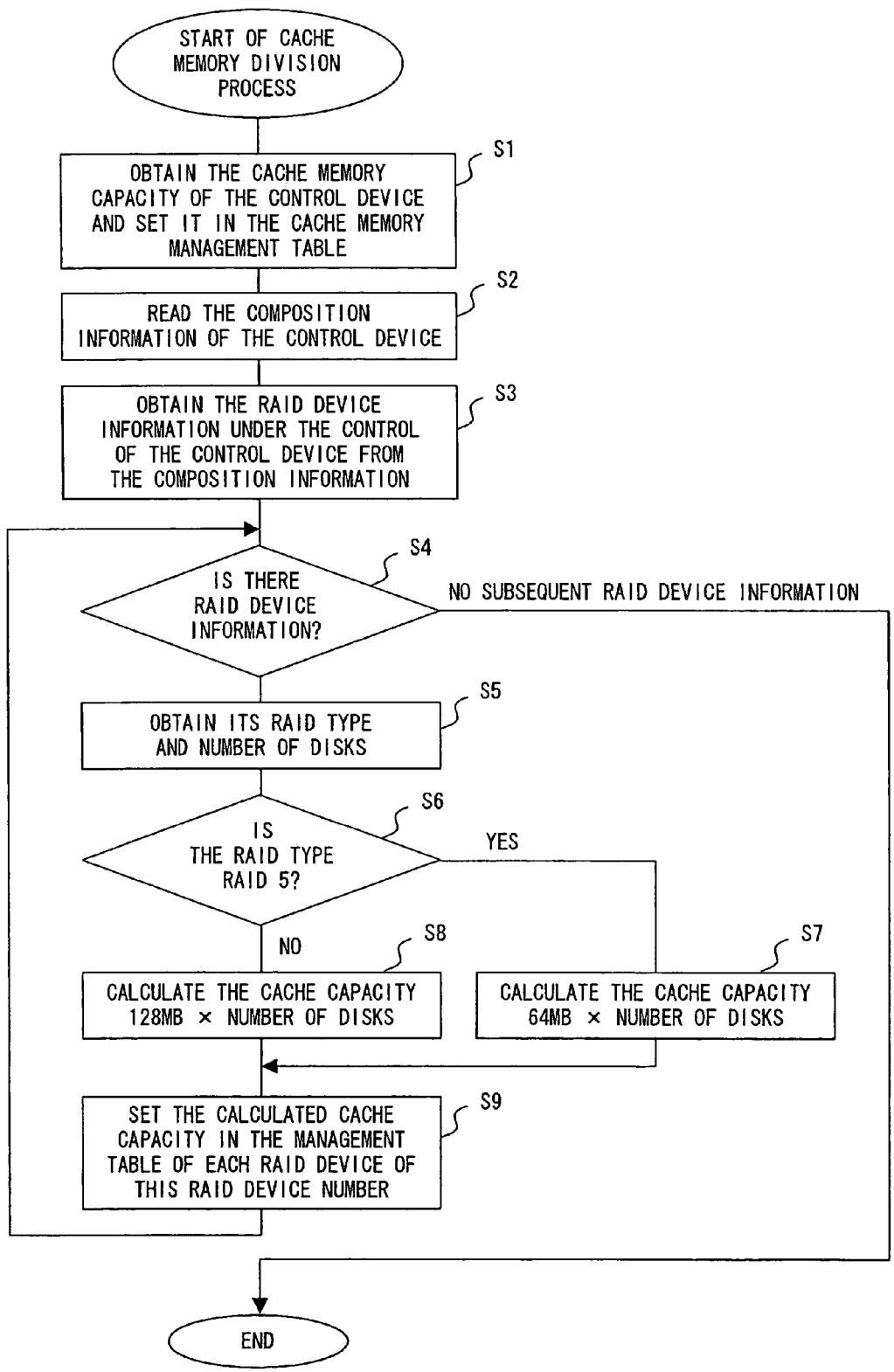
FIG. 4 is a flowchart showing a cache memory division process.

In the preferred embodiment, firstly, the cache memory 16 of the RAID control device 10 is divided according to the throughput performance of the RAID device 12, and the cache memory 16 is prevented from being filled with data to be written back into a RAID device with low throughput performance by allocating each division result to each RAID device 12. FIG. 4 is a flowchart showing this cache memory division/allocation process. In FIG. 4, when the power of the device is switched on and its device energization process is started, the cache memory division/allocation process is executed as one of initialization processes.

In step S1 of FIG. 4, the cache memory capacity, in this case 2 GB, of the RAID control device 10 is obtained and is set in the cache memory management table 17. In step S2, the composition information of the RAID control device 10 is read. In step S3, information about a plurality of RAID devices 12 under the control of the RAID control device 10 is obtained from the composition information. Steps S4 through S9 are applied to the plurality of RAID devices 12 according to the information.

Firstly, in step S4, it is determined whether there is information about a RAID device 12 to be processed. If there is the information, in step S5, both its RAID type (level) and the number of disks are obtained, and in step S6, it is determined whether the RAID type is RAID5. If the RAID type is RAID5, in step S7, cache capacity to be allocated is calculated (64 MB×number of disks). If it is not RAID5, in step S8, the cache capacity is calculated (128 MB×number of disks) Then, in step S9, the calculated cache capacity is set in the management table 18 of each RAID device, and the processes in steps S4 and after are repeated. When the above-mentioned process is completed for all RAID devices 12, the cache memory division process is terminated.

Figure 5:
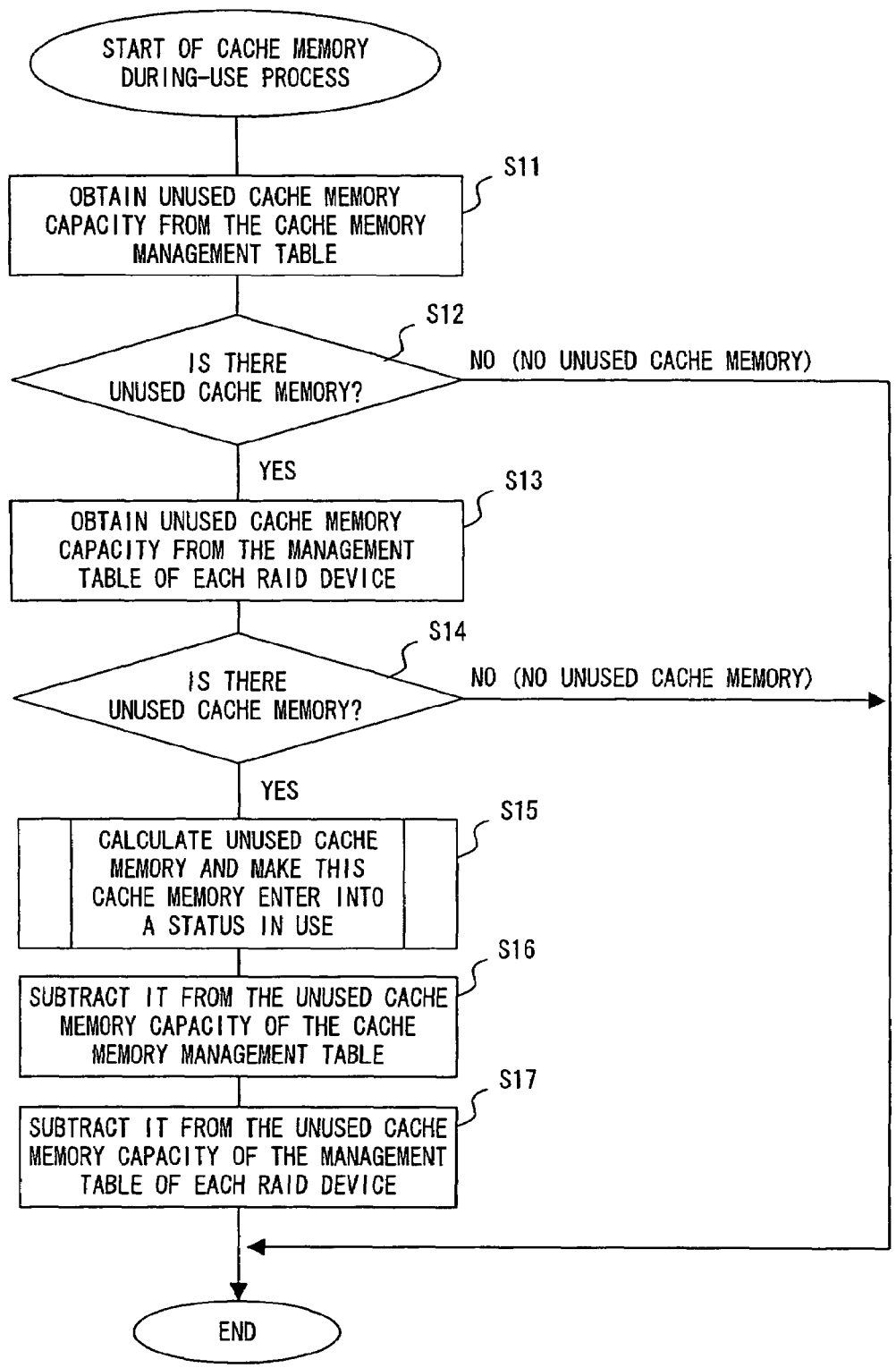
FIG. 5 is a flowchart showing a process during the use of cache memory.

FIG. 5 is a flowchart showing a cache memory during—use process. FIG. 5 is a flowchart showing a process of using control information (table) when data is stored in the cache memory 16 of the RAID control device 10 shown in FIG. 3 from the host computer 11.

When in FIG. 5 the process is started, firstly, in step S11, the unused cache memory capacity of the cache memory 16 is obtained from the cache memory management table 17 shown in FIG. 3. In step S12, it is determined whether there is the unused cache memory, that is, cache memory capacity sufficient to store data. If there is no unused cache memory, the process is immediately terminated.

If there is the unused cache memory, in step S13, the unused cache memory capacity is obtained from the management table 18 of each RAID device. In this process, the unused cache memory capacity is obtained from the management table 18 of each RAID device corresponding to the address to store data, according to the cache capacity set in each RAID device 12 in FIG. 4, such as cache capacity designated by the address. However, in step S14, it is determined whether there is the unused cache memory in the management table 18 of each RAID device corresponding to the address. If there is no unused cache memory, that is, if data cannot be stored in the address too, the process is immediately terminated.

If in step S14, there is the unused cache memory, in step S15, for example, data is stored in the unused cache memory, and a process of making the cache memory enter into a used status is performed. In step S16, the capacity made in use is subtracted from the unused cache memory capacity of the cache memory management table 17. In step S17, the capacity made in use is subtracted from the unused cache memory capacity stored in the management table 18 of each RAID device, that is, the unused cache memory capacity of the full cache memory capacity allocated to the RAID device 12, and the process is terminated. The detailed contents of the management table of each RAID device are described later with reference to FIG. 7.

Figure 6:
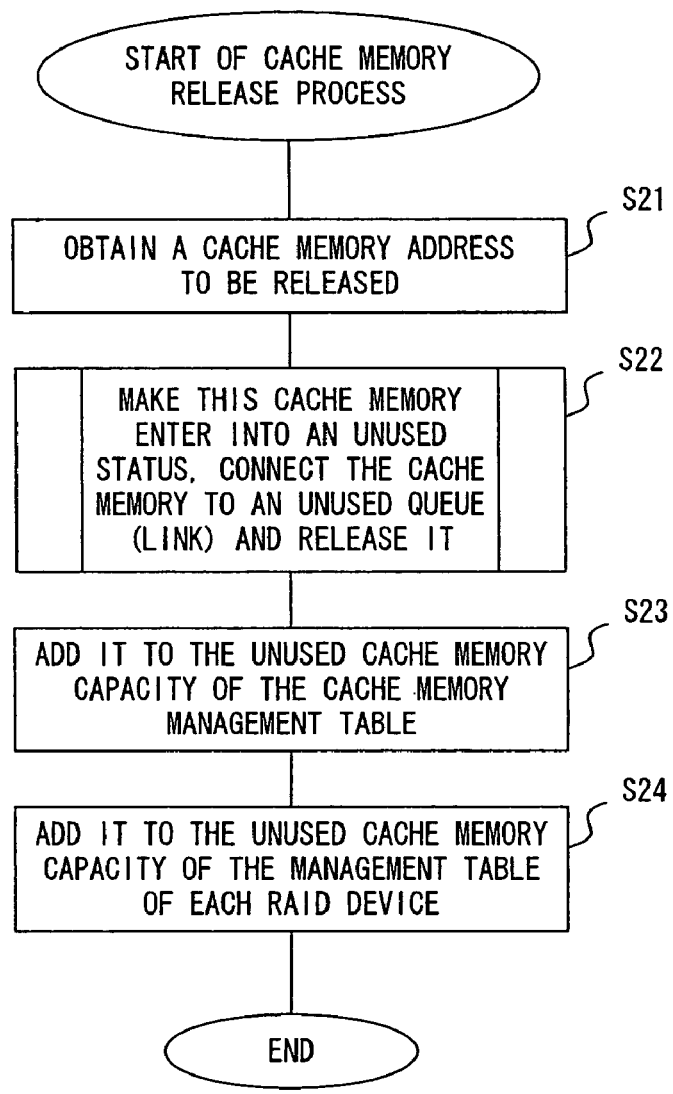
FIG. 6 is a flowchart showing a process at the least time of cache memory.

FIG. 6 is a flowchart showing a process at the time of cache memory release. This process is performed, for example, when data is deleted from the cache memory. Firstly, in step S21, the address of cache memory to be released is obtained. In step S22, this cache memory is made to enter into an unused status, and, for example, cache memory with that address is connected to an unused queue (link) stored in the cache memory management table 17 and is released. In step S23, the released capacity is added to the unused cache memory capacity of the cache memory management table 17. In step S24, the released capacity is also added to the unused cache memory capacity of the management table 18 of each RAID device, and the process is terminated.

Figure 7:
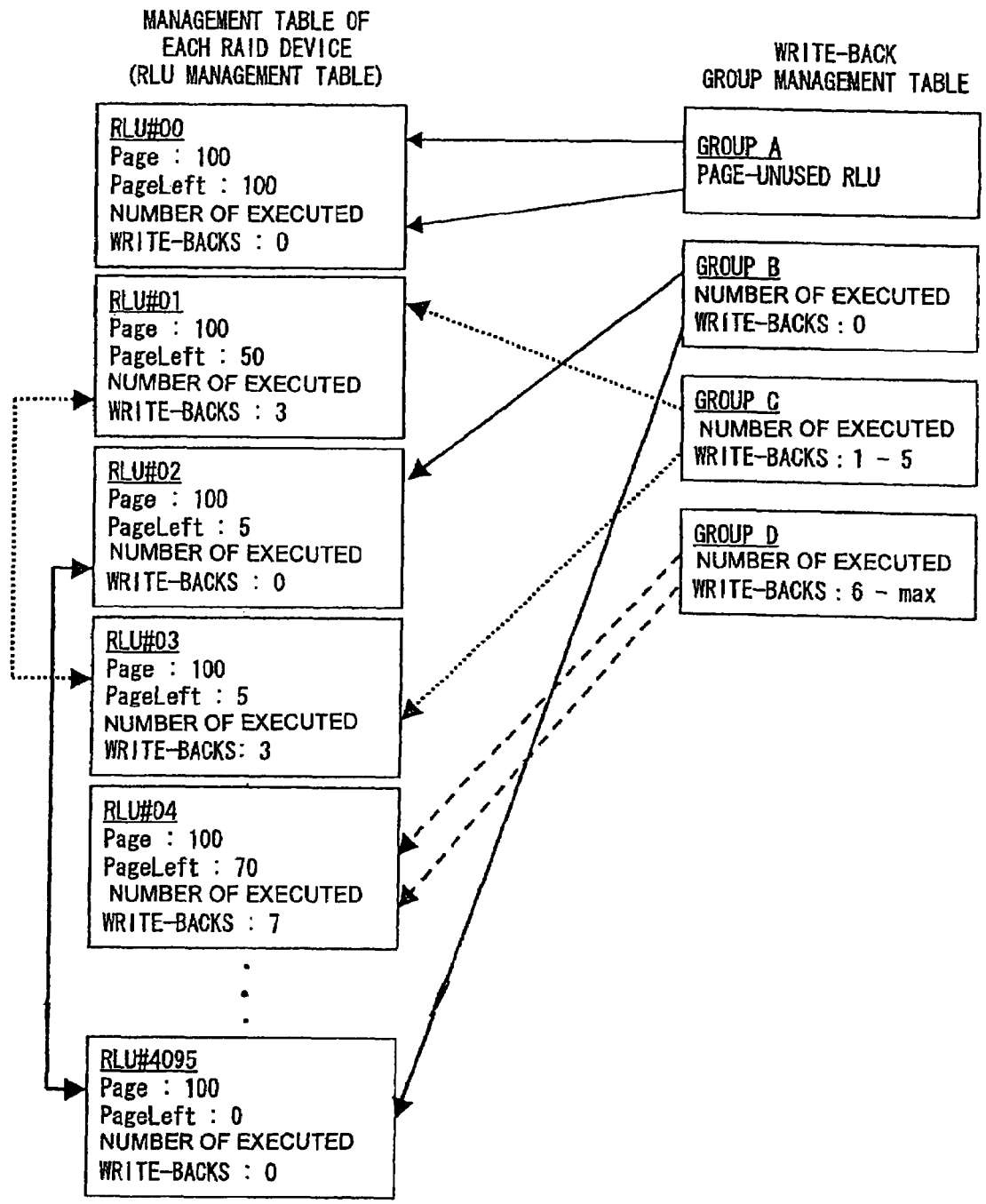
FIG. 7 explains the grouping of RAID devices.

FIG. 7 shows specific examples of the respective stored contents of both the management table 18 of each RAID device and write-back group management table 19 shown in FIG. 3. The management table 18 of each RAID device is also called "RLU (RAID logical unit management table,"and stores the number of pages of cache memory allocated to total 4,096RAID devices 12, RLU#00 through RLU#4095pages left as the number of unused pages of the allocated pages and the number of executed write-backs for each RAID device 12.

The write-back group management table 19 groups and manages RAID devices with a similar number of executed write-backs. In this example, group A is a group of RAID devices whose cache memory is unused and which need no write-back Group B is a group of RAID devices whose cache memory is used and the number specifying write-backs is 0. Group C is a group of RAID devices whose cache memory is used and the number of write-backs, is 1 through 5. Group D is a group of RAID devices whose cache memory is used and the number of write-backs is 6 or more. In FIG.7, the management table 18 of each RAID device is linked to each group and is managed by each group. In this example, it is easily determined that in group B, that is, in RLU#02 and RLU#4095, write-back is necessary since the number of currently executed write-backs is small there, and also, unused page capacity is small.

Figure 8:
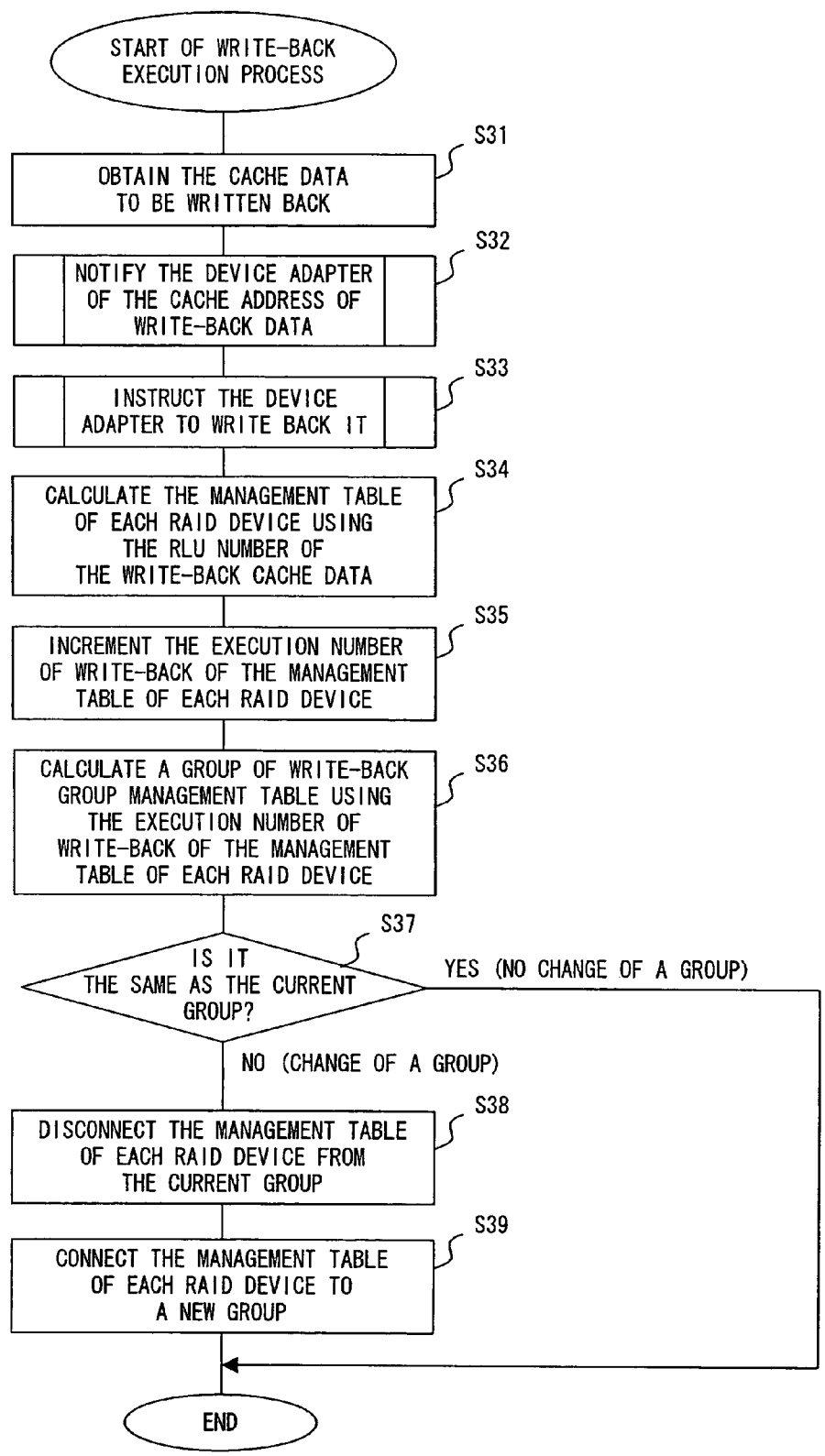
FIG. 8 is a flowchart showing a write-back execution process.

FIG. 8 is a flowchart showing a write-back execution process in the preferred embodiment. In the preferred embodiment, as described above, a write-back execution process is performed using a write-back schedule by a regular LRU method. Then, a RAID device with a small execution number of write-backs is checked, and a write-back schedule is further executed in units of RAID devices. However, the write-back execution process shown in FIG. 8 is similarly performed in both write-back by a regular LRU method and write-back in units of RAID devices.

When in FIG. 8, the process is started, firstly, in step S31, cache data to be written back is obtained. In step S32, the cache address of write-back data is notified to the device adaptor 14 shown in FIG. 3. In step S33, the write-back of the data is instructed. Then, in step S34, the management table 18 of each RAID device is calculated using an RLU number corresponding to the cache data to be written back. In step S35, the write-back execution number of the table is incremented. In step S36, a group in the write-back group management table 19 is calculated corresponding to the incremented execution number using the incremented execution number.

Then, in step S37, it is determined whether the RAID device 12 still stays in the same group as the current one even after the execution number of write-backs is incremented. If the RAID device 12 still stays in the same group, the process is immediately terminated. If the group must be modified, in step S38, the management table 18 of each RAID device is disconnected from the current group. In step S39, the management table 18 is connected to a new group, and the process is terminated.

FIG. 9 is a flowchart showing a write-back completion process performed after receiving a notice indicating that the write-back execution process is completed from the device adapter 14 shown in FIG. 3. In reality, since the write-back of data from the cache memory 16 into the RAID device 12 takes a fairly long time, a fairly long time is necessary before the write-back completion process shown in FIG. 9 is started after the write-back of data is instructed to the device adapter 14 shown in FIG. 8.

In step S41 of FIG. 9, cache data to be written back is obtained. In step S42, the write-back data is disconnected from the queue of the cache data of each RAID device. This queue of the cache data of each RAID device is shown in FIG. 10.

Figure 10:
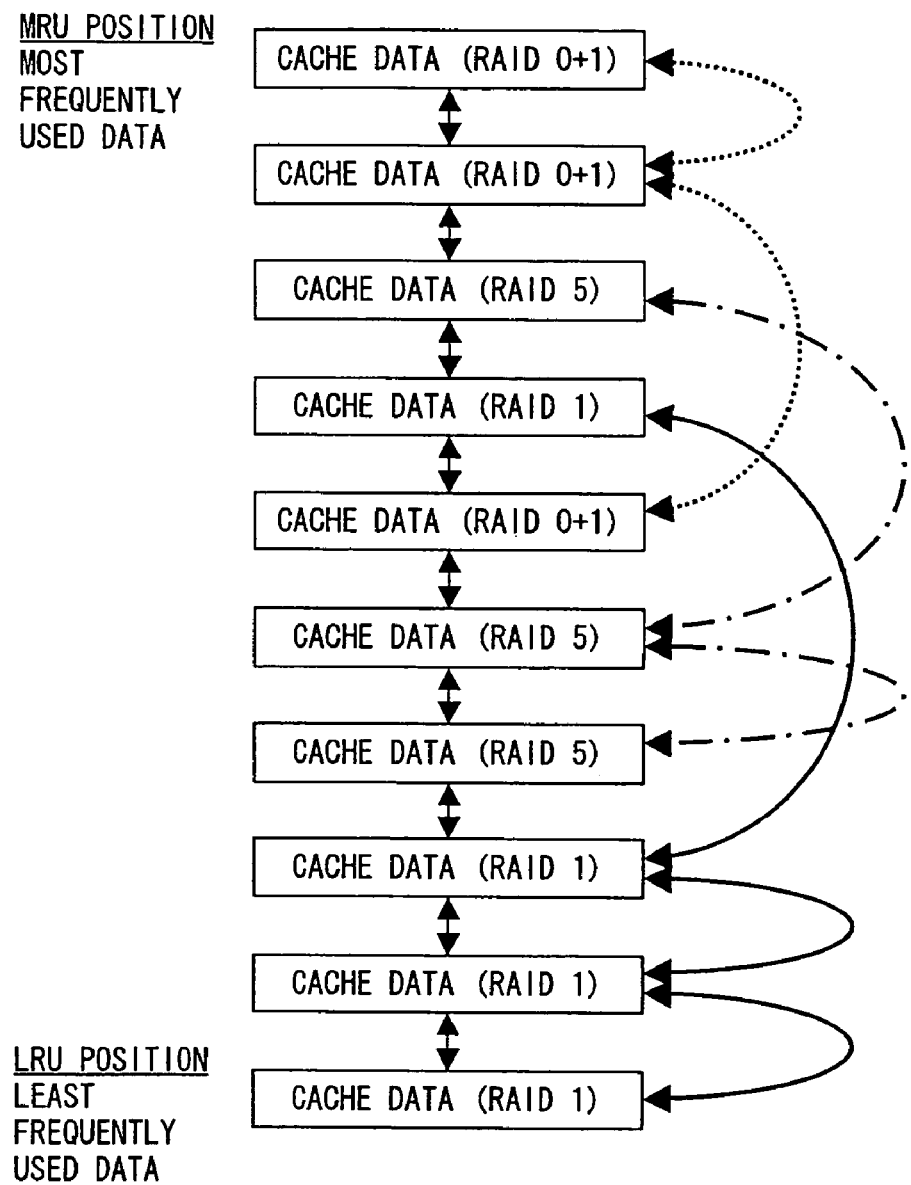
FIG. 10 explains the queue (link) of cache data.

In FIG. 10, the queue (link) of each RAID device is established among data located in the MRU position, that is, the most frequently used data and data located in the LRU position, that is, the least frequently used data. In FIG. 10, a sold arrow, an one-dot chain arrow and a dotted arrow represent the data link (bi-directional) of a RAID device with RAID1, that of a RAID device with RAID5 and that of a RAID device with RAID0+1, respectively. An upward arrow indicates cache data toward the top, and is called "previous pointer". A downward arrow indicates cache data toward the end, and is called "next pointer". Since in FIG. 3, there are two RAID devices for each type, for example, two solid queues (links) are established between each pair of devices.

After in step S42 of FIG. 9, the write-back data is disconnected from the queue, in step S43, the management table 18 of each RAID device is calculated using an RLU number corresponding to the written-back cache data. In step S44, the write-back execution number of the management table 18 is decremented, and a group in the write-back group management table 19 is calculated using the write-back execution number obtained as the result of the decrement in step S44 in the same way as in step S36 of FIG. 8. Then, in steps S46 through S48, the same processes as in steps S37 through S39 of FIG. 8 are performed, and the process is terminated.

Figure 11:
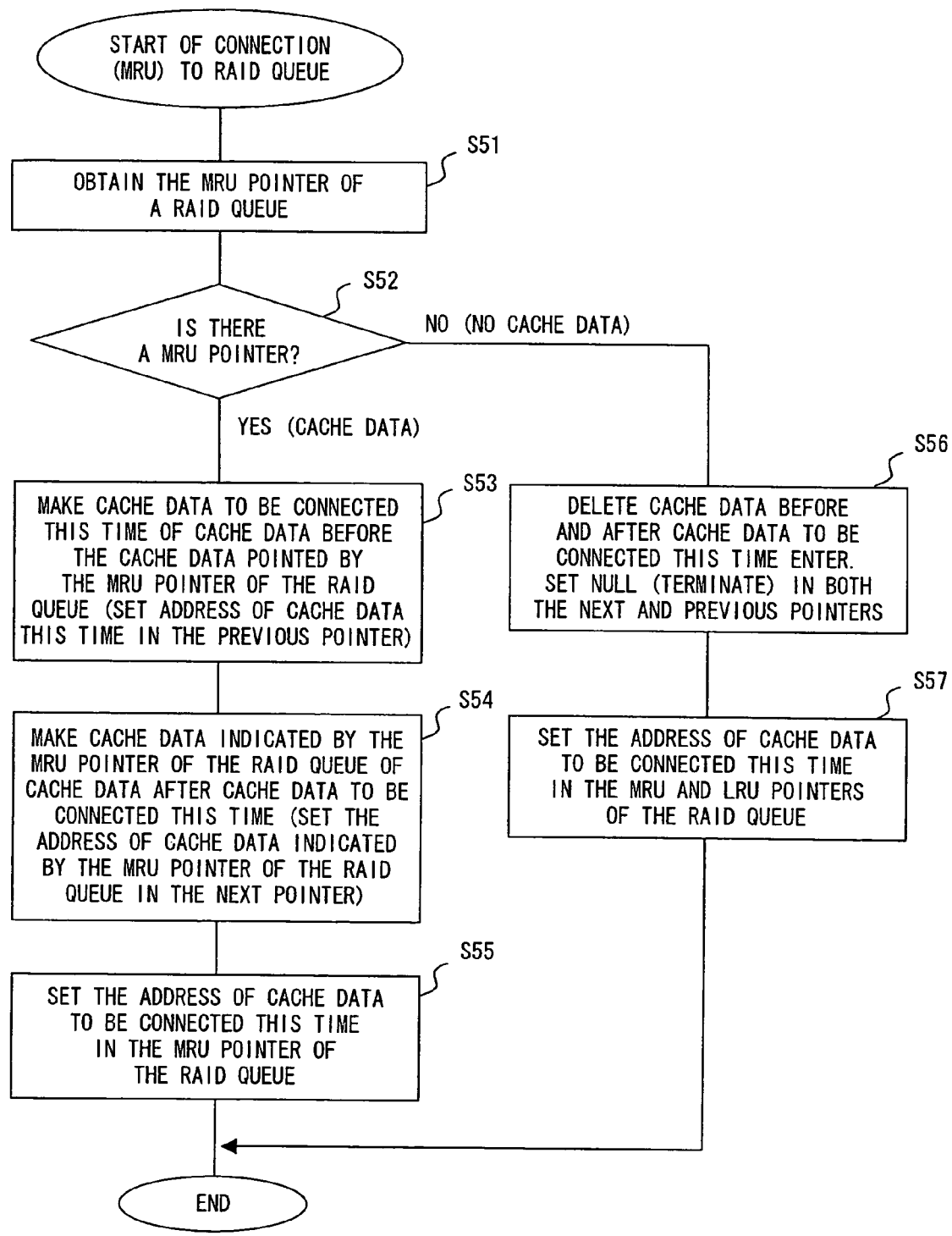
FIG. 11 is a flowchart showing a connection process to the RAID queue.
Figure 12:
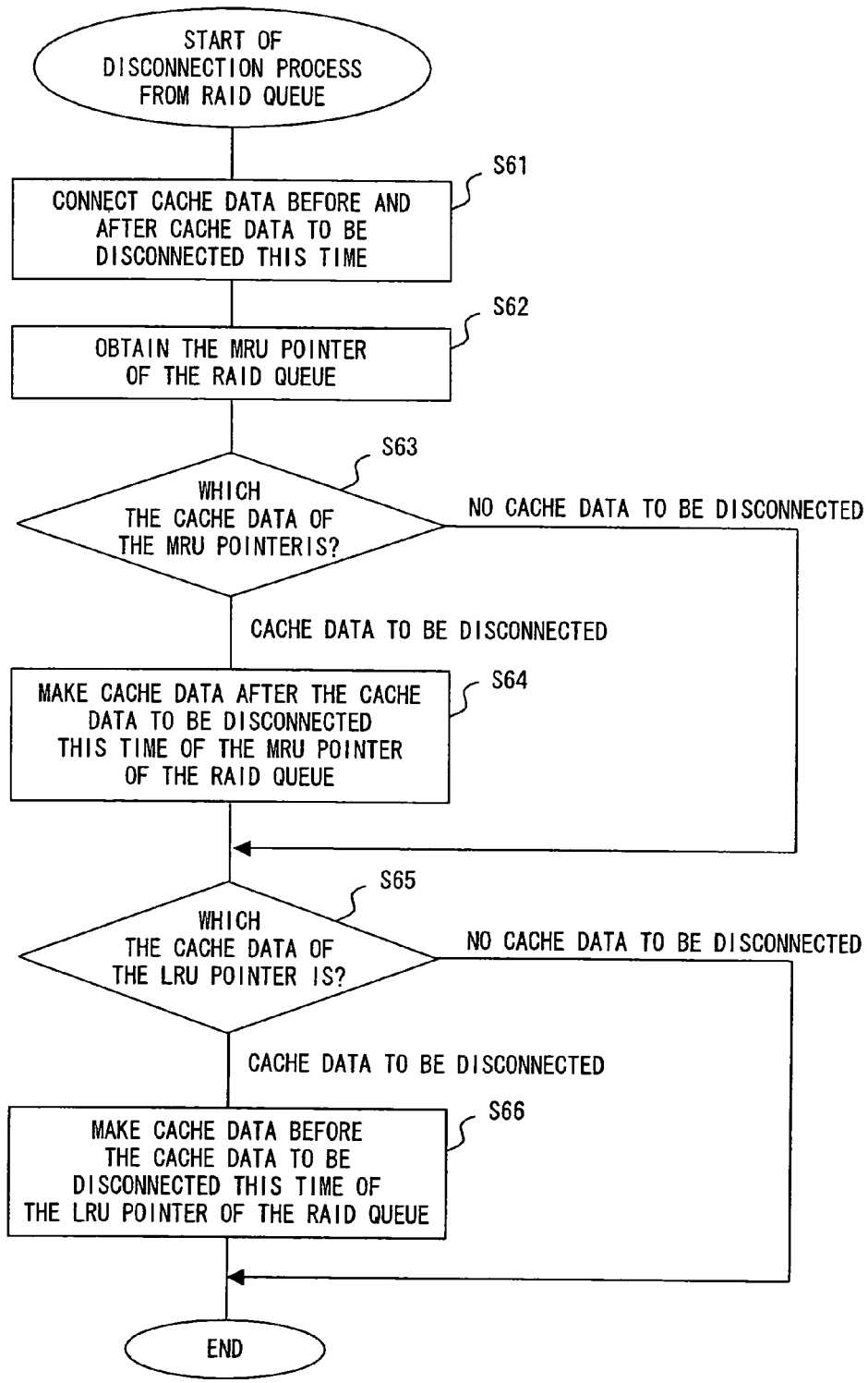
FIG. 12 is a flowchart showing a disconnection process from the RAID queue.

FIGS. 11 and 12 are flowcharts showing the management process of this queue of each RAID device. FIG. 11 is a flowchart showing a queue connection process and FIG. 12 is one showing a queue disconnection process.

When the queue connection process of FIG. 11 is started, firstly, in step S51, the MRU pointer of the queue is obtained. In step S52, it is determined whether there is this pointer. If there is the pointer, it means that there is cache data. In step S53, in order to put this new cache data before the cache data indicated by the MRU pointer, a previous pointer is set in the address of the new cache data. In step S54, in order to put the cache data indicated by the current MRU pointer after the cache data to be connected this time, the address of the cache data indicated by the current MRU pointer is set as a next pointer. In step S55, the address of the cache data to be connected this time is set as the MRU pointer, and the process is terminated.

If in step S52 it is determined that there is no MRU pointer, it means that there is no cache data. In step S56, in order to indicate a status in which there is no cache data before and after cache data to be connected this time, NULL (terminate) is set in both a next pointer and a previous pointer. In step S57, the address of the cache data to be connected this time is set in each of the MRU and LRU pointers, and the process is terminated.

FIG. 12 is a flowchart showing the data disconnection process from the RAID queue. When in FIG. 12, the process is started, in step S61, two segments of cache data before and after the cache data to be disconnected this time are connected by a link. In step S62, the MRU pointer is obtained. In step S63, it is determined whether cache data indicated by the MRU pointer is cache data to be disconnected this time. If it is the cache data to be disconnected this time, the MRU pointer is modified so as to point cache data after the cache data to be disconnected this time, and in step S65 it is determined whether cache data indicated by the LRU pointer is the cache data to be disconnected. If it is not the cache data to be disconnect this time, in step S65, immediately it is determined whether cache data indicated by the LRU pointer is the cache data to be disconnected. If it is the cache data to be disconnected, in step S66, the LRU pointer is modified so as to indicate cache data before the cache data to be disconnected this time. If it is not the cache data to be disconnected, the process is immediately terminated.

Figure 13:
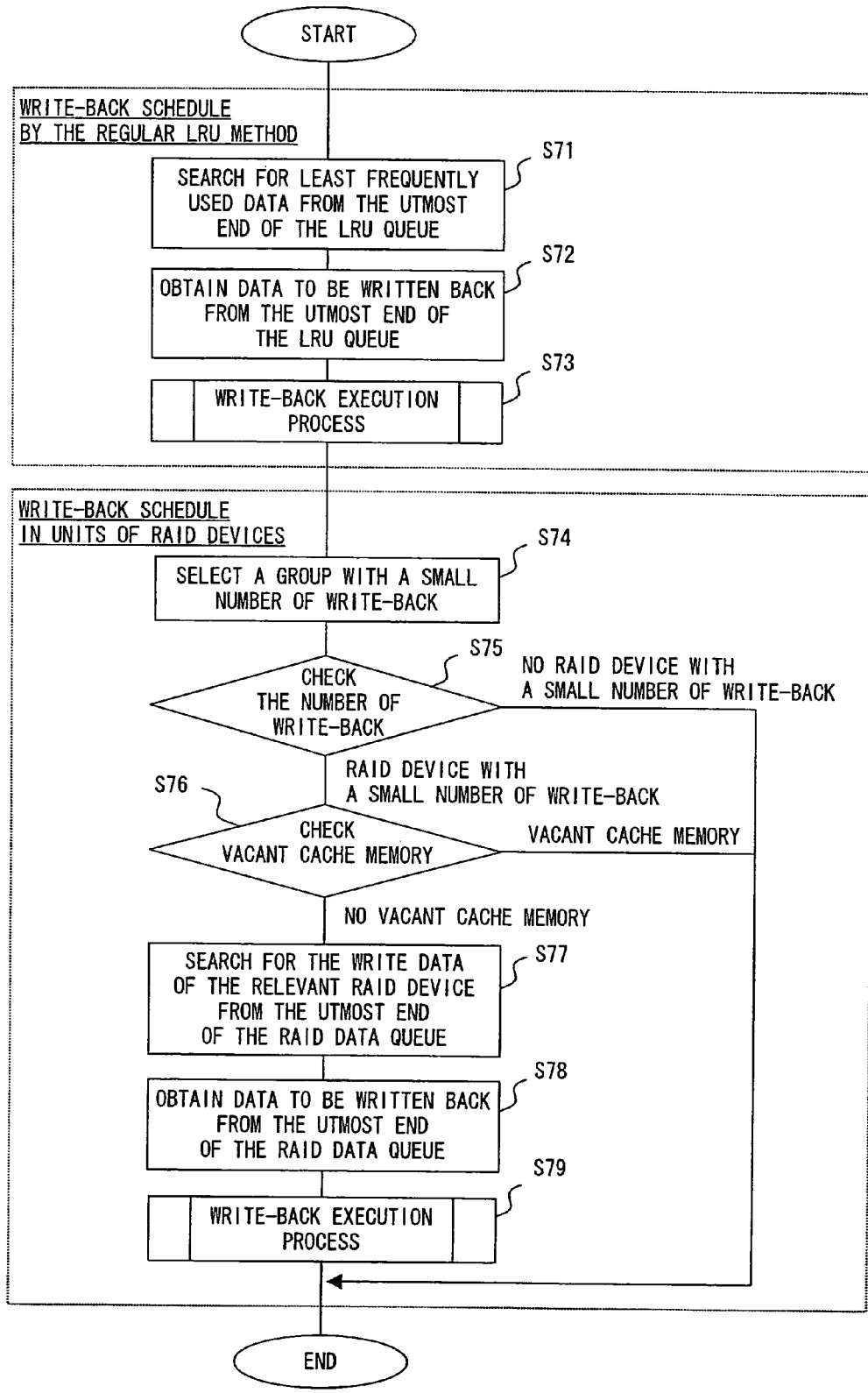
FIG. 13 is the entire flowchart of the write-back process.

FIG. 13 is a detailed flowchart showing the write-back schedule process in the preferred embodiment. In FIG. 13, firstly, in steps S71 through S73, a write-back schedule process by the regular LRU method is performed. In this process, firstly, in step S71, the least frequently used data is searched for from the utmost end of the LRU queue, that is, the queue shown in FIG. 1. In step S72, the data is obtained as data to be written back. In step S73, the write-back execution process is applied to the data. This process has been already described with reference to FIG. 8.

Then, in steps S74 through S78, the write-back schedule process in units of RAID devices is performed. Firstly, in step S74, a group of RAID devices with a small number of write-backs is selected. In step S75, the number of write-backs is checked for each RAID device. If there is no RAID device with a small number of write-backs, the process is immediately terminated. If there is a RAID device with a small number of write-back, in step S76, it is determined whether there is vacant cache memory, that is, whether there is a vacant area in the area allocated to the RAID device 12 with a small number of write-backs in the cache memory 16 of the RAID control device shown in FIG. 3. If there is a vacant area, the process is terminated since there is no need to further write back data.

If there is no vacant cache memory, in step S77 data to be written back to the relevant RAID device is retrieved from the utmost end of the RAID data queue. In step S78, the data is obtained as data to be written back. In step S79, the write-back execution process is performed, and the process is terminated.

So far the RAID control device and control method of the present invention have been described in detail. However, this RAID control device can be configured using a generalpurpose computer as a base. FIG. 14 is a block diagram showing the configuration such a computer system, that is, a hardware environment.

In FIG. 14, the computer system comprises a central processing unit (CPU) 20, read-only memory (ROM) 21, random-access memory (RAM) 22, a communication interface 23, a storage device 24, an input/output device 25, a portable storage medium reader device 26 and a bus 27 connecting all the components.

For the storage device 24, various types of storage devices, such as a hard disk, a magnetic disk or the like, can be used. The programs shown in the flowcharts of FIGS. 4 through 6, 8, 9 and 11 through 13, programs set forth in the claims of the present invention and the like are stored in such a storage device 24 or ROM 21, and by enabling the CPU 20 to execute such programs, the allocation of cache memory to a plurality of RAID devices and grouping of RAID devices by the execution number of write-back and the like in the preferred embodiment can be realized.

Such programs can also be, for example, stored in the storage device 24 by a program provider 28 through a network 29 and the communication interface 23, or in a portable storage medium 30 which is sold and distributed in the market, be set in the reader device 26 and be executed by the CPU 30. For the portable storage medium 30, various types of storage media, such as CD-ROM, a floppy disk, an optical disk, a magneto-optical disk, a DVD or the like, can be used, and by enabling the reader device 26 to read the programs stored in such a storage medium, evenly distributed write-back scheduling for all RAID devices in the preferred embodiment can be realized.

What is claimed is:

1. A storage control device for controlling a plurality of storage devices, comprising:
   an LRU write-back unit for writing back data stored in cache memory of the storage control device to the plurality of storage devices by the LRU method;
   a write-back group management unit managing a plurality of groups of the storage devices, wherein a range of a number of write-backs currently executed by the LRU write-back unit is predefined for each of the groups and each storage device is grouped into a group which has the range including the number of write-backs currently executed by the LRU write-back unit for the storage device; and
   a write-back schedule processing unit for selecting a storage device within a group whose range indicates smaller number of write-backs than other groups and writing back data into the selected storage device.

2. The device of claim 1, further comprising
   a storage device management unit storing the number of write-backs currently executed for each of the plurality of storage devices, wherein
   said write-back group management unit manages the groups according to stored contents of said storage device management unit.

3. The device of claim 1, further comprising:
   a cache memory allocation unit dividing the cache memory capacity of said storage control device and allocating each divided capacity to the plurality of storage devices; and
   a storage device management unit storing the capacity of the unused area, in which no data is stored, of the allocated capacity of the cache memory for each storage device, wherein said write-back schedule processing unit selects a storage device with a small unused area according to the stored contents of the storage device management unit.

4. The device of claim 3, further comprising
   a cache memory management unit for managing respective queues for the storage devices wherein each queue is the queue of data stored in the cache memory capacity allocated to a corresponding storage device, wherein
   said write-back schedule processing unit is arranged to write back data located in the LRU position of the queue of the selected storage device.

5. A data storage system, comprising
   (a) a storage control device, comprising an LRU write-back unit for writing back data stored in cache memory of the storage control device into a plurality of external storage devices by the LRU method,
   a write-back group management unit managing a plurality of groups of the storage devices, wherein a range of a number of write-backs currently executed by the LRU write-back unit is predefined for each of the groups and each storage device is grouped into a group which has the range including the number of write-backs currently executed by the LRU write-back unit for the storage device and
   a write-back schedule processing unit for selecting a storage device within the group whose range indicates smaller number of write-backs than other groups and for writing back data into the selected storage device; and
   (b) a plurality of storage devices controlled by the storage control device.

6. The system of claim 5, wherein
   said storage devices are RAID devices provided with a plurality of disks, and
   said storage control device is a RAID control device for controlling a plurality of the RAID devices.

7. The system of claim 5, wherein said storage control device further comprises
   a storage device management unit for storing the number of write-backs currently executed for each of the plurality of storage devices, and
   said write-back group management unit manages the groups according to stored contents of the storage device management unit.

8. The system of claim 5, wherein said storage control device further comprises
   a cache memory allocation unit for dividing the cache memory capacity of said storage control device and allocating each divided capacity to the plurality of storage devices; and
   a storage device management unit for storing the capacity of the unused area, in which no data is stored, of the allocated capacity of the cache memory for each storage device, and
   said write-back schedule processing unit is arranged to select a storage device with a small unused area according to the stored contents of the storage device management unit.

9. The system of claim 8, wherein said storage control device further comprises
   a cache memory management unit for managing respective queues for the storage devices wherein each queue is the queue of data stored in the cache memory capacity allocated to a corresponding storage device and said write-back schedule processing unit is arranged to write back data located in the LRU position of the queue of the selected storage device.

10. A storage control method for controlling a plurality of storage devices, comprising:

writing back data stored in cache memory into the plurality of storage devices by the LRU method;

managing a plurality of groups of the storage devices wherein a range of a number of write-backs currently executed by the LRU method is predefined for each of the groups and each storage device is grouped into a group which has the range including the number of write-backs currently executed by the LRU method for the storage device; and selecting a storage device within the group whose range indicates smaller number of write-backs than other groups and writing back data into the selected storage device.

11. The method of claim 10, comprising:

storing the number of write-backs currently executed for each of the plurality of storage devices; and the groups are managed according to the stored number of write-backs.

12. The method of claim 10, comprising:

dividing cache memory capacity of the storage control device and allocating each divided capacity to the plurality of storage devices; and storing the capacity of the unused area, in which no data is stored, of the allocated capacity of the cache memory for each storage device, and selecting a storage device with a small unused area according to the stored capacity of the unused area.

13. The method of claim 12, comprising:

managing respective queues for the storage devices wherein each queue is the queue of data stored in the cache memory capacity allocated to a corresponding storage device, and writing back data located in the LRU position of the queue of the selected storage device.

14. A computer-readable portable storage medium on which is recorded a program for enabling a computer controlling a plurality of storage devices to execute a process, said process comprising:

writing back data stored in cache memory into the plurality of storage devices by the LRU method;

managing a plurality of groups of the storage devices, wherein a range of a number of write-backs currently executed by the LRU method is predefined for each of the groups and each storage device is grouped into a group which has the range including the number of write-backs currently executed by the LRU method for the storage device; and selecting a storage device within the group whose range indicates smaller number of write-backs than other groups and writing back data into the selected storage device.

15. The medium of claim 14, wherein the process comprises storing the number of write-backs currently executed for each of the plurality of storage devices; and the groups are managed according to the stored number of write-backs.

16. The medium of claim 14, wherein the process comprises selecting a storage device with a small unused area according to the stored contents of memory storing the capacity of an unused area, in which no data is stored, of the capacity of the cache memory which is obtained by dividing the cache memory capacity of the storage control device and allocated to the plurality of storage devices, for each storage device.

17. The medium of claim 16, wherein said process comprises:

managing respective queues for the storage devices wherein each queue is the queue of data stored in cache memory capacity allocated to a corresponding storage device; and writing back data located in the LRU position in the queue of the selected storage device.

* * * * *